United States Patent [19]

Moriyama

[11] Patent Number: 4,599,794
[45] Date of Patent: Jul. 15, 1986

[54] APPARATUS FOR BARING ELECTRIC CABLES

[76] Inventor: Takashi Moriyama, 2-3-3, Uozaki-nishimachi, Higashinada-ku, Kobe 658, Japan

[21] Appl. No.: 664,498

[22] Filed: Oct. 25, 1984

[30] Foreign Application Priority Data

Apr. 7, 1984 [JP] Japan ............................ 59-069808

[51] Int. Cl.$^4$ ............................................. B21F 13/00
[52] U.S. Cl. ........................................ 30/90.6; 30/90.1
[58] Field of Search ....................... 30/90.1, 90.4–91.2

[56] References Cited

U.S. PATENT DOCUMENTS

| | | | |
|---|---|---|---|
| 1,406,486 | 2/1922 | Perlman | 30/90.6 X |
| 2,120,398 | 6/1938 | Edwards et al. | 30/90.6 |
| 2,347,956 | 5/1944 | Lansing | 30/90.6 |
| 3,151,510 | 10/1964 | Bunker et al. | 30/90.6 |
| 3,198,038 | 8/1965 | Fleming | 30/90.6 |
| 3,237,300 | 3/1966 | Townsend et al. | 30/90.6 |
| 3,431,645 | 3/1969 | Powell | 30/90.6 |
| 4,356,630 | 11/1982 | David | 30/90.6 X |

*Primary Examiner*—James M. Meister
*Attorney, Agent, or Firm*—Marshall, O'Toole, Gerstein, Murray & Bicknell

[57] ABSTRACT

Two casings are hinged together along a laterally extending hinge axis. Each casing has a generally box-like configuration with an open side, and a pair of laterally spaced blades are fastened to each casing. The blades have semicircular longitudinally extending cutting edges adjacent the open sides of the casings, and the edges are symmetrically arranged on opposite sides of the hinge axis. Further, a blade having a laterally extending cutting edge is mounted in one of the casings and extends between the two longitudinal blades of the casing. The two casings have holders or braces for properly locating a cable relative to the blades and for pressing the cable against the laterally extending cutting edge when the casings are pivoted to close the open sides.

2 Claims, 4 Drawing Figures

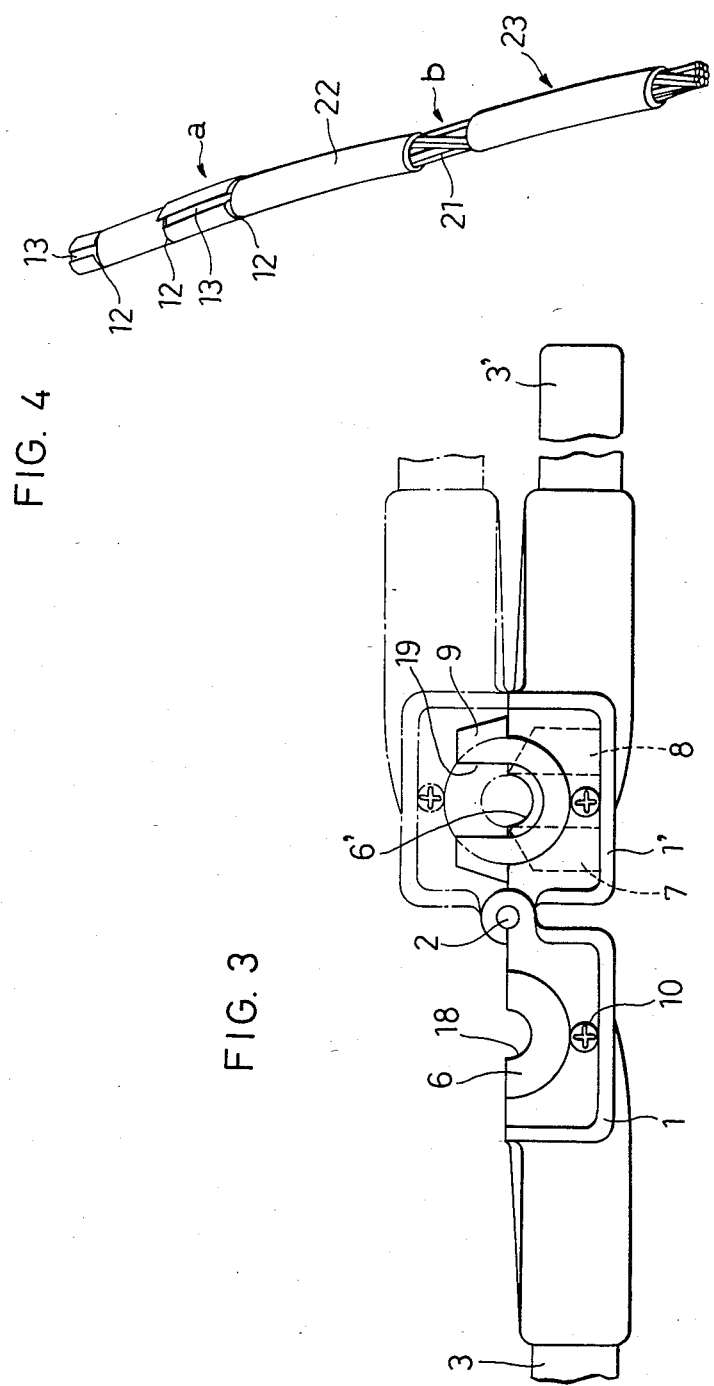

APPARATUS FOR BARING ELECTRIC CABLES

BACKGROUND OF THE INVENTION

The present invention relates to an apparatus for use in removing a portion of a flexible insulating sheath or cover of an electric cable in order to bare a portion of the conductive core of the cable for connection of the core with a terminal or for other purposes. The core may be a multiple strand or single strand wire.

Conventionally, a portion of the core of an electric cable has been bared by cutting its sheath or cover with a knife and then peeling off a portion of the sheath, or by shaving a portion of the sheath from off the core. This operation is usually difficult, particularly for power cables and especially in winter when the sheath is hard.

A general object of the invention is to provide an improved apparatus for baring a portion of the core of an electric cable easily even at an elevated location above the ground and in cold weather, without damaging the conductive core of the cable.

SUMMARY OF THE INVENTION

Apparatus in accordance with this invention comprises two casings which are hinged together along a laterally extending hinge axis. Each casing has a generally box-like configuration with an open side, and a pair of laterally spaced blades are fastened to each casing. The blades have semicircular longitudinally extending cutting edges adjacent the open sides, and the edges are symmetrically arranged on opposite sides of the hinge axis. Further, a blade having a laterally extending cutting edge is mounted in one of the casings and extends between the two longitudinal blades of the casing. Further, the two casings have holders or braces for properly locating a cable relative to the blades.

A cable to be bared is positioned between the two casings and the casings are pivoted on the hinge axis to move the open sides together. The opposed sets of longitudinally extending blades form two spaced circular cuts in the cable, and the laterally extending blade forms a cut that extends between the two circular cuts. The holders of the casings press the cable against the blades. After the cuts are made, the casings are opened and the portion of the sheath between the circular cuts is removed.

BRIEF DESCRIPTION OF THE DRAWINGS

A preferred embodiment of the invention is shown in the accompanying drawings, wherein:

FIG. 3 is an elevational side view thereof; and

FIG. 4 is a perspective view of an electric cable following operation by the apparatus in FIGS. 1–3.

DETAILED DESCRIPTION OF THE DRAWINGS

Figure 1:
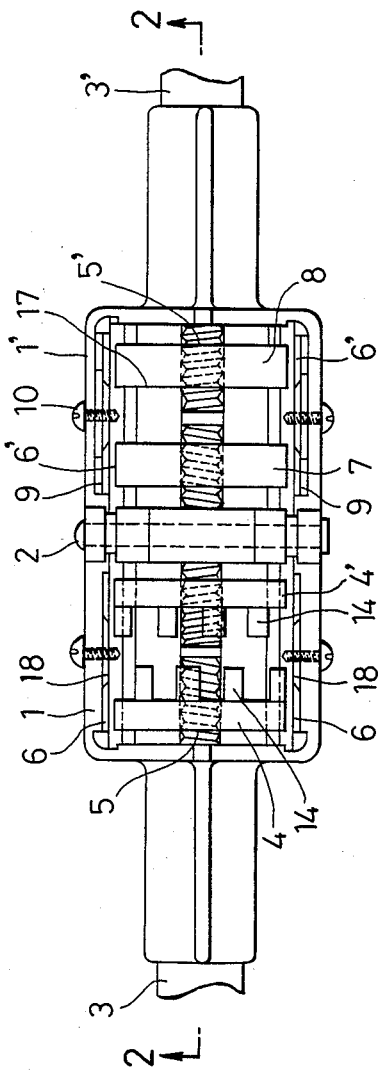
FIG. 1 is a top plan view of an apparatus according to the invention, in an open position.
Figure 2:
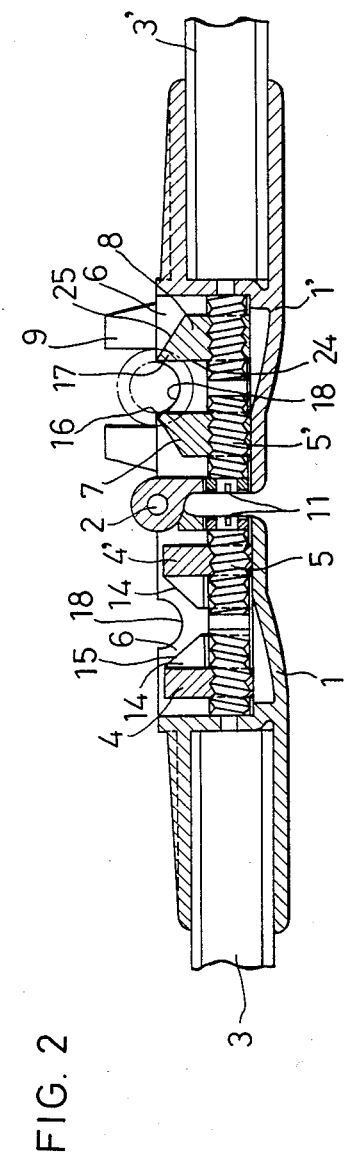
FIG. 2 is a sectional side view thereof taken on the line 2—2 of FIG. 1.

With reference to FIGS. 1 to 3, the apparatus includes a pair of rectangular casings 1 and 1', each having an open side, which have lateral adjacent sides that are hinged together by a pin 2 to close the open sides, as shown by the dashed lines in FIG. 3. The casings 1 and 1' have handles 3 and 3' respectively fixed to their lateral sides which are opposite the hinged sides, the handles being used to manually swing the casings between the open and closed positions.

Fixed to the casing 1 by screws 10 are a pair of flat replaceable blades 6. The blades 6 form the longitudinal sides of the casing 1 and are perpendicular to the hinge pin 2. Each blade 6 has a semicircularly concave cutting edge 18 opening toward the open side of the casing 1. The concave edge 18 has a radius substantially equal to that of the conductive core of a cable to be bared. A plurality of blades having different radius edges 18 may be provided for use with different size cables.

The casing 1 supports a longitudinally extending screw 5 rotatably therein, which extends perpendicularly to the pin 2 approximately midway between the blades 6. The screw 5 has two oppositely formed threads on its ends, and an end groove 11 is formed in it for rotating the screw by a screw driver.

The casing 1 further contains a pair of laterally extending holders 4 and 4' which are longitudinally slidable therein and extend parallel to the pin 2 and between the two blades 6. Each holder 4 and 4' has an internally threaded hole formed therethrough which engages with one of the threaded ends of the screw 5. Thus, turning the screw 5 simultaneously moves the holders toward and away from each other by equal amounts, and the blade edges 18 are always centered between the holders 4 and 4'.

Each holder 4 and 4' has a plurality of spaced engaging fingers or members 14 which project therefrom perpendicularly to the pin 2. The members 14 of each holder 4 and 4' extend toward the other holder, and they are staggered (see FIG. 1) so as to interleave or enter the spaces therebetween when the members 4 and 4' are moved toward each other. Each member 14 has a slanted side 15 adjacent the open side of the casing 1, as shown in FIG. 2. The slanted sides 15 form a valley between the holders 4 and 4', which opens toward the open side of the casing 1 and extends parallel to the pin 2.

Fixed to the other casing 1' is a pair of replaceable blades 6' held by screws 10, similar to the blades 6. The blades 6' are constructed similarly to those of the casing 1, and the blades 6 and 6' are symmetric with respect to the pin 2. The casing 1' also has a screw 5', which is substantially the same as the screw 5 and is supported rotatably and symmetrically with the screw 5 with respect to the pin 2.

The casing 1' supports a laterally extending holder 7 and cutter 8, both slidable in the case 1', which extend parallel to the pin 2. The holder 7 and the cutter 8 each has an internally threaded hole formed therethrough, and they engage with the oppositely oriented threads of the screw 5', in order to move the holder and cutter either toward or away from each other, similarly to the movement of the pair of holders 4 and 4'.

The holder 7 has a slanted or rounded corner 16 which is adjacent the cutter 8 and the open side of the casing 1'. The cutter 8 has a straight laterally extending cutting edge 17 adjacent the holder 7 and the open side of the casing 1'. The slant corner 16 and the cutting edge 17 are substantially parallel to the pin 2 and perpendicular to the blades 6 and 6' and the screw 5. The concave cutting edges 18 of the blades 6' of the casing 1' are always longitudinally centered between the straight cutting edge 17 and the edge of the slanted corner 16.

Also fixed to the casing 1' is a pair of replaceable guides 9 held by the screws 10. Each guide 9 is located adjacent and on the laterally outer side of a blade 6' of the casing 1'. Each guide 9 has a generally U-shaped opening which forms a pair of guide edges 19 that are substantially perpendicular to the screw 5', and the lower parts of the edges 19 are spaced from each other by the distance which is equal to the outer diameter of a cable. Alternatively, the sides 19 may not be parallel, but open in a V-shape away from the casing 1'. The sides 19 are located to center the concave cutting edges 18 of the blades 6' therebetween.

To bare a portion of a cable, the diameters of the core 21 and the outer sheath 22 of a cable 23 (FIG. 4) are determined. Blades 6 and 6' having radiuses equal to the core radius are installed, and a guide 9 having an opening equal to the sheath diameter is installed. The screws 5 and 5' are then turned to move the holders or braces 4, 4' and 7 and the cutting edge 17 apart the proper distances. The sides 15 and 16 are located to tightly engage the outer sheath of the cable and press it against the cutting edge 17 which is located to cut to the outer surface of the core 21. The cable is then laid in the openings of the guides 9, the cable extending in parallel with the pin 2, as shown by the dash-dot lines in FIG. 2.

The casing 1 is then closed with the casing 1', whereby the slant sides 15 of the holders 4 and 4' compress the cable 23 against the slant side 16 of the holder 7 and the straight cutting edge 17. The slant side 16 compresses the sheath and forms a dent in it as shown in FIG. 2, and the edge 17 makes a tangential axial cut 13 in the cable sheath 22, while the opposed concave cutting edges 18 make circular cuts 12 in the sheath at both ends of the axial cut 12. Thereafter the casings are opened.

The two surfaces 24 and 25 forming the straight cutting edge 17 form an angle as large as about 60°. The surface 24 projects tangentially of the core 21 and in the direction of movement of the cable as the cable is pressed down against the edge 17. The other surface 25 extends at the above-mentioned angle to the surface 24 so as to open the flap or cut 13 of the portion a between the cuts 12 of the cable sheath. This facilitates the manual removal of the cut sheath portion a. A bared cable portion is shown at b.

Thus, the present apparatus allows easy and safe baring of a cable. A cable can be bared at any portion whether it is at an end or an intermediate section. A desired extended length of a cable can be bared by successively repeating the operation at adjacent portions.

What is claimed is:

1. Apparatus for baring a portion of an electric cable having a conductive core and a sheath surrounding the core, said apparatus comprising first and second casing means, each of said casing means having an open side and said casing means being hinged together on an axis whereby said casings are pivotable to close said open sides, a pair of blades fixed to each of said casing means and mounted substantially symmetrically about said axis, each of said blades having a semicircularly concave cutting edge extending perpendicularly to said axis and having substantially the same radius as the cable core, holders supported by said first casing means and extending between said blades of said first casing means, and a cutter which is supported by said second casing means and extending between said blades, said cutter having a straight cutting edge extending substantially parallel to said axis, whereby when said casings are pivoted to close said open sides said holders compress the cable against said straight cutting edge and said concave cutting edges form an arcuate cut in the sheath, said holders of said first casing means comprising a pair of holders located on opposite sides of the midpoints of said concave cutting edges of said first casing means, a support on said second casing means, said support having a side extending parallel to said axis, said side of said support and straight cutting edge being located on the opposite side of the midpoints of said concave cutting edges of said second casing means, a screw supported rotatably by each of said casing means and extending perpendicularly to said axis, each of said screws having two oppositely directed threads thereon, said holders of said first casing means being supported slidably in said first casing means and having a threaded hole formed therethrough which engages with one of said threads of said screw of said first casing means, so as to move said holders toward and away from each other, said support and cutter each having a threaded hole formed therethrough and engaging with one of said threads of said screw of said second casing means, so as to moves said support and cutter toward and away from each other.

2. Apparatus for baring a portion of an electric cable having a conductive core and a sheath surrounding the core, said apparatus comprising first and second casing means, each of said casing means having an open side and said casing means being hinged together on an axis whereby said casings are pivotable to close said open sides, a pair of blades fixed to each of said casing means and mounted substantially symmetrically about said axis, each of said blades having a semicircularly concave cutting edge extending perpendicularly to said axis and having substantially the same radius as the cable core, holders supported by said first casing means and extending between said blades of said first casing means, and a cutter which is supported by said second casing means and extending between said blades, said cutter having a straight cutting edge extending substantially parallel to said axis, whereby when said casings are pivoted to close said open sides said holders compress the cable against said straight cutting edge and said concave cutting edges form an arcuate cut in the sheath, said holders of said first casing means comprising a pair of holders located on opposite sides of the midpoints of said concave cutting edges of said first casing means, each of said holders having a slanted side for compressive engagement with the cable, said slanted sides of said holders forming a valley therebetween which opens toward said open side of said first casing means and extends in parallel to said axis.

* * * * *